May 3, 1938.   R. THIELE   2,115,830
SEAT POST
Filed May 13, 1937
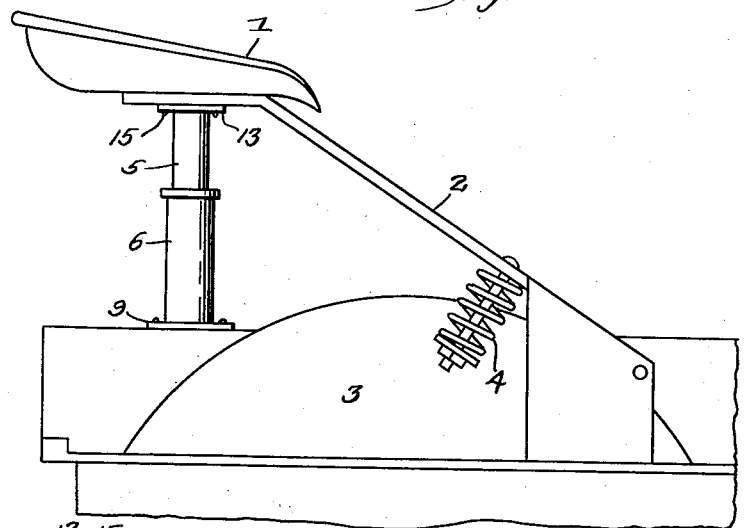
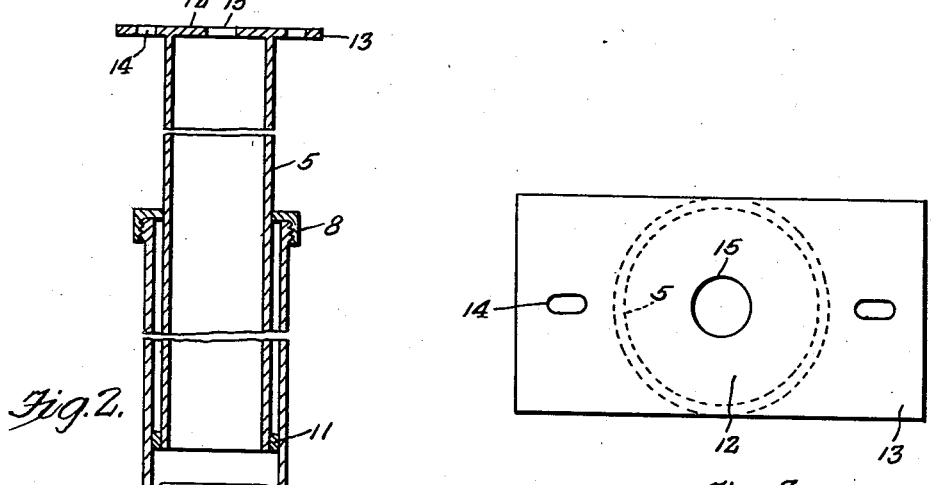
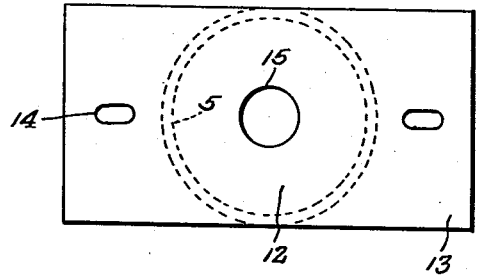
Inventor
Richard Thiele,
By Clarence A. O'Brien
Hyman Berman
Attorneys Patented May 3, 1938

2,115,830

UNITED STATES PATENT OFFICE 2,115,830

SEAT POST

Richard Thiele, Valley Mills, Tex.

Application May 13, 1937, Serial No. 142,519

1 Claim. (Cl. 155—51)

My invention relates to improvements in seat posts for use in cushioning and supporting the seat of a tractor, harvester, or the like, and the primary object thereof is to provide a simply constructed, inexpensive and efficient device of this character for use beneath the usual spring supported seat of tractors or the like, for cushioning downward movement of the latter, checking rebound, and supporting the seat in the event of breakage of the usual seat supporting spring.

To the accomplishment of the above, and subordinate objects presently appearing, a preferred embodiment of my invention has been illustrated in the accompanying drawing, set forth in detail in the following description, and defined in the claim appended hereto.

In said drawing:

Figure 1 is a fragmentary view of a tractor having the usual spring supported seat and embodying my invention, Figure 2 is a view in vertical section of my improved seat post detached, and Figure 3 is a view in top plan of the seat post drawn to an enlarged scale.

Referring to the drawing by numerals, the usual tractor seat 1, as is well known, is mounted upon a leaf spring, as at 2, in a floating position above the chassis 3 of the tractor, rebound of the spring 2 being checked, in this instance, by a coil spring 4 suitably secured to said spring 2 and to the chassis 3. In the event of breakage of the spring 2, the operator of the tractor is liable to serious injury by being precipitated onto the chassis.

According to my invention, a seat post is provided comprising upper and lower telescopic tubular sections 5 and 6, respectively, the latter having a closed base end 7 and a base flange 9, preferably rectangular, provided with bolt holes 10 by means of which the device is bolted to the chassis 3, as at 11, in upstanding position immediately below the seat 1. Threaded onto the upper end of the lower section 6 is an annular guide cap 8 through which the upper section 5 is fitted to slide therethrough. The upper section 5 is sufficiently smaller, in diameter, than the lower section 6 to provide a slight clearance between said sections and thereby reduce friction therebetween. At its lower end the upper section 5 has threaded, or otherwise secured thereon, a ring 11 spacing said end from the section 6 and adapted to coact with the cap 8 to limit outward movement of the inner section on the rebound thereof. The upper section 5 is provided with an upper closed end 12 and an upper end flange 13, also preferably rectangular, and provided with bolt slots 14 by means of which said section is secured as by bolts 15 to the under side of the spring 2. The purpose of having the flange 13 slotted is to permit sliding compensating movement of the seat 1 on the section 5 and thereby prevent binding of the section 5 in the section 6 under arcuate movement of the seat 1. The closed end 12 of the section 5 is provided with an aperture 15 for the accommodation of the usual bolt (not shown), securing the seat 1 to the spring 2.

In the bottom of the lower section 6 is a cushion member 16 of any suitable resilient material, such as rubber, and interposed between said cushion member 16 and the section 5 is a tension spring 17.

The sections 5 and 6 are so designed that normally, that is to say, when the seat 1 is unoccupied, the upper section 5 is spaced above the spring 17, whereby under the weight of a person occupying the seat 1, the maximum load is sustained by the usual spring 2. However, the spring 17 is sufficiently reactive so that in the event that the spring 2 breaks, the occupant of the seat is yieldingly supported against shock or jar. The ring 11 may be of resilient material whereby as will be clear, rebound under the action of the springs 2 and 17 will be checked, the space between said ring 11 and the cap 8 functioning as an air cushion.

The invention together with the advantages thereof, will, it is believed, be clear from the foregoing description without further explanation.

Manifestly the invention, as described, is susceptible of modification without departing from the inventive concept, and right is herein reserved to such modifications as fall fairly within the scope of the claim appended hereto.

What I claim is:

In a tractor, the combination with a seat, and a leaf spring supporting the seat in floating position, of a support beneath said seat comprising upper and lower telescopic sections, the former slidably secured to said seat to permit longitudinal movement of the leaf spring relative to said support and the lower fixed to the body of the tractor against lateral movement, and resilient means in the lower section interposed between the bottom thereof and the upper section, and comprising a lower pad of resilient material, and a compression spring seated on said pad, the upper section being normally spaced above said compression spring.

RICHARD THIELE.